US012738206B2

United States Patent
(12) United States Patent
Zhou et al.

(10) Patent No.: US 12,738,206 B2
(45) Date of Patent: Sep. 15, 2026

(54) LED ARRAY DISPLAY UNIT, DISPLAY SCREEN AND DISPLAY SYSTEM

(71) Applicant: HKC CORPORATION LIMITED, Shenzhen (CN)

(72) Inventors: Mancheng Zhou, Shenzhen (CN); Haijiang Yuan, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 19/182,684

(22) Filed: Apr. 18, 2025

(65) Prior Publication Data

US 2025/0349246 A1 Nov. 13, 2025

(30) Foreign Application Priority Data

May 10, 2024 (CN) ......................... 202410572370.6

(51) Int. Cl.
*G09G 3/32* (2016.01)
*G09G 3/20* (2006.01)

(52) U.S. Cl.
CPC ............. *G09G 3/32* (2013.01); *G09G 3/2014* (2013.01); *G09G 2320/066* (2013.01)

(58) Field of Classification Search
CPC ......................................................... G09G 3/32
USPC ........................................................... 345/691
See application file for complete search history.

(56) References Cited

U.S. PATENT DOCUMENTS

2015/0156829 A1 6/2015 Lin et al.
2020/0043405 A1* 2/2020 Akimoto .................. G09G 3/32

FOREIGN PATENT DOCUMENTS

| | | | | |
|---|---|---|---|---|
| CN | 100526956 C | * | 8/2009 | ............. H05B 41/36 |
| CN | 101950541 A | * | 1/2011 | ........... G09G 3/3406 |
| CN | 102779479 A | | 11/2012 | |
| CN | 103258499 A | | 8/2013 | |
| CN | 106328043 A | | 1/2017 | |
| CN | 106124872 B | * | 3/2019 | ............ G01R 29/16 |
| JP | 2002366099 A | | 12/2002 | |

* cited by examiner

*Primary Examiner* — Duane N Taylor, Jr.

(57) ABSTRACT

Provided are a light emitting diode (LED) array display unit, a display screen, and a display system. The LED array display unit includes a plurality of light emitting diodes, and in each row of the LED array display unit, two compensation units connected in parallel are provided between any two adjacent light emitting diodes. Each compensation unit includes an adjustable capacitor and a reverse unit connected in series. A capacitance value of a parasitic capacitor between any two adjacent light emitting diodes is a first capacitance value, and capacitance values of all adjustable capacitors are set to the first capacitance value. Two reverse units between any two adjacent light emitting diodes have opposite conduction directions.

19 Claims, 7 Drawing Sheets

LED ARRAY DISPLAY UNIT, DISPLAY SCREEN AND DISPLAY SYSTEM

CROSS-REFERENCE TO RELATED APPLICATION

Pursuant to 35 U.S.C. § 119 and the Paris Convention, this application claims the benefit of Chinese Patent Application No. 202410572370.6 filed on May 10, 2024, the content of which is incorporated herein by reference.

TECHNICAL FIELD

The present application relates to the field of display technology, and in particular to a light emitting diode (LED) array display unit, a display screen, and a display system.

BACKGROUND

The statements provided herein are merely background information related to the present application, and do not necessarily constitute any prior arts. Currently, the application of LED display screens is becoming increasingly widespread. The circuit structure of LED display screens includes common anode circuits and common cathode circuits. In these two types of driving circuit structures, the parasitic capacitor between the wires can lead to strong interference between the display channels. This causes high-brightness images to interfere with low-brightness images when the high-brightness images and the low-brightness image overlap in one row, resulting in a high-contrast interference phenomenon. Moreover, the more the ratio of high-brightness to low-brightness or even no brightness in a row of light emitting diodes, the more severe the high-contrast interference phenomenon becomes.

SUMMARY

The present application provides an LED array display unit, a display screen, and a display system, which solves the problem of high-contrast interference of LED display screens in existing technologies.

To achieve the above objective, the following technical solutions are adopted in the present application.

In accordance with a first aspect, the present application provides an LED array display unit, in each row of the LED array display unit, a first compensation unit and a second compensation unit connected in parallel are provided between any two adjacent light emitting diodes. The first compensation unit includes a first adjustable capacitor and a first reverse unit that are connected in series, and the second compensation unit includes a second adjustable capacitor and a second reverse unit that are connected in series. A capacitance value of a parasitic capacitor between the two adjacent light emitting diodes is a first capacitance value, and capacitance values of the first adjustable capacitor and the second adjustable capacitor are set to the first capacitance value. The first reverse unit and the second reverse unit have opposite conduction directions.

In the LED array display unit provided by the present application, the compensation units connected in parallel are provided between any two adjacent light emitting diodes, and each compensation unit includes an adjustable capacitor and a reverse unit connected in series. By means of the compensation units, the interference between light emitting diodes in the same row caused by the parasitic capacitor between the wires is eliminated, the high-contrast interference phenomenon of the LED display screen can be improved, and the product quality can be enhanced.

In some possible implementations, an input end of the first reverse unit is connected to a first LED, and an output end of the first reverse unit is connected to a second LED. The first LED and the second LED are two adjacent light emitting diodes in any row of the LED array display unit. The first LED, the first adjustable capacitor, the first reverse unit and the second LED constitute a first conductive channel when a driving voltage on the first LED increases by a first voltage and an increased voltage is greater than a driving voltage on the second LED. A first compensation voltage is generated on the second LED under an action of the first conductive channel, and the first compensation voltage and the first voltage are reversely equal.

In some possible implementations, an input end of the second reverse unit is connected to the second LED, and an output end of the second reverse unit is connected to the first LED. The second LED, the second reverse unit, the second adjustable capacitor and the first LED constitute a second conductive channel when the driving voltage on the second LED increases by a second voltage and an increased voltage is greater than the driving voltage on the first LED. A second compensation voltage is generated on the first LED under an action of the second conductive channel, and the second compensation voltage and the second voltage are reversely equal.

In some possible implementations, the capacitance value of the first adjustable capacitor is set to the first capacitance value, which includes that: the capacitance value of the first adjustable capacitor is adjusted when the first LED is lit up and other LED channels in the row where the first LED is located are switched off, and the capacitance value of the first adjustable capacitor is locked when the second LED is in an off state, to obtain the first capacitance value.

In some possible implementations, cathodes of the first LED and the second LED are respectively connected to a row drive unit, and anodes of the first LED and the second LED are respectively connected to a column drive unit. Or alternatively, the anodes of the first LED and the second LED are respectively connected to the row drive unit, and the cathodes of the first LED and the second LED are respectively connected to the column drive unit.

In some possible implementations, the first reverse unit is a NOT gate or an inverter. The second reverse unit is a NOT gate or an inverter.

In some possible implementations, the LED array display unit is respectively connected to the output end of the row drive unit and the output end of the column drive unit. The first LED is lit up, which includes that: the row where the first LED is located is controlled to display based on a row switch level signal output by the row drive unit. The first LED is driven to light up based on a pulse width modulation (PWM) signal output by the column drive unit.

In some possible implementations, the capacitance value of the first adjustable capacitor is adjusted, and the capacitance value of the first adjustable capacitor is locked when the second LED is in the off state, which includes that: the capacitance value of the first adjustable capacitor is gradually increased from 0, and the capacitance value of the first adjustable capacitor is locked when the second LED after adjustment is in the off state. After adjustment, the potential difference across the second LED is 0.

In accordance with a second aspect, the present application provides an LED display screen, including: one or more LED array display units, a row drive unit and a column drive unit. Each LED array display unit is the LED array display unit in the first aspect, and the LED array display unit includes a plurality of light emitting diodes. The row drive unit is configured to control the LED array display unit to switch a row based on a row switch level signal. The column drive unit is configured to generate a PWM signal according to grayscale data, and the PWM signal is configured to control the light emitting diodes in the LED array display unit to light up or switch off.

In accordance with a third aspect, the present application provides an LED display system, including: the LED display screen in the second aspect, an image source module, a data processing module and a power supply module. The image source module is connected to the data processing module, and the LED display screen is connected to the power supply module and the data processing module respectively. The image source module is configured to send a display image to the data processing module. The data processing module is configured to receive the display image and generate grayscale data according to the display image, and send the grayscale data to the LED display screen. The power supply module is configured to supply power to the LED display. The LED display is configured to receive the grayscale data and display an image according to the grayscale data.

In accordance with a fourth aspect, the present application provides a computer-readable storage medium on which a computer program (also referred to as an instruction or code) for implementing the method in the first aspect is stored. For example, the computer program, when executed by a computer, enables the computer to execute the method in the first aspect.

In accordance with a fifth aspect, the present application provides a chip, including a processor. The processor is configured to read and execute a computer program stored in a memory to execute the method in the first aspect or in any possible implementation of the first aspect. Optionally, the chip also includes a memory, and the memory is connected to the processor by a circuit or wires.

In accordance with a sixth aspect, the present application provides a chip system, including a processor. The processor is configured to read and execute a computer program stored in a memory to execute the method in the first aspect or in any possible implementation of the first aspect. Optionally, the chip system also includes a memory, and the memory is connected to the processor by a circuit or wires.

In accordance with a seventh aspect, the present application provides a computer program product, the computer program product including a computer program (also referred to as an instruction or code), and the computer program when executed by an electronic device, causes the electronic device to implement the method in the first aspect.

It can be understood that the beneficial effects of the second to seventh aspects can be referred to the relevant description of the first aspect, and will not be described again here.

DETAILED DESCRIPTION

Figure 1:
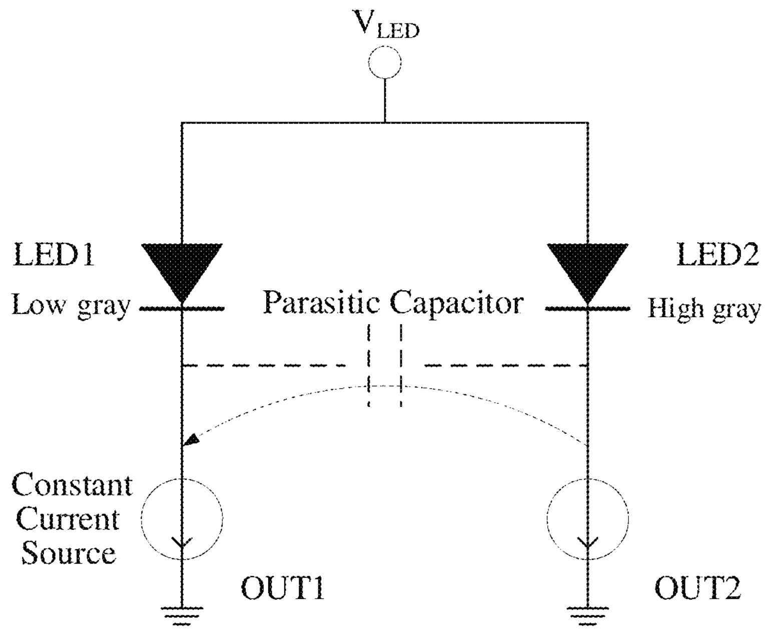
FIG. 1 is a schematic structural diagram of an LED display circuit in the existing technologies.

In order to make the objectives, technical solutions and advantages of the embodiments of the present application clearer, the technical solutions in the embodiments of the present application will be clearly and completely described in combination with the drawings in the embodiment of the present application. Obviously, the described embodiments are part of the embodiments of the present application, not all of the embodiments. Based on the embodiments in the present application, all other embodiments obtained by persons skilled in the art without exerting creative efforts are within the protection scope of the present application.

The term "and/or" herein is a description of the association relationship of the associated objects, indicating that there may be three relationships. For example, A and/or B may represent: A exists alone, A and B exist at the same time, and B exists alone. The symbol "/" herein indicates that the associated objects are in an or relationship, for example, A/B means A or B.

The terms "first" and "second" in the specification and claims herein are used to distinguish different objects, rather than to describe the specific order of objects. In the description of the embodiments of the present application, unless otherwise specified, the meaning of "multiple" refers to two or more than two, for example, multiple processing units refer to two or more processing units, etc., and multiple elements refer to two or more elements, etc.

In the embodiments of the present application, the words "exemplary" or "for example" are used to indicate examples, illustrations or explanations. Any embodiment or design described as "exemplary" or "for example" in the embodiments of the present application should not be interpreted as being more preferred or more advantageous than other embodiments or designs. Rather, the use of words such as "exemplary" or "for example" is intended to present related concepts in a concrete way.

To facilitate the understanding of the embodiments of the present application, some of the terms in the embodiments of the present application are explained below to facilitate the understanding of persons skilled in the art.

Pulse width modulation (PWM) is a technology that uses pulses to output analog signals. PWM controls the level by changing the duty cycle of the signal to adjust the brightness of the light emitting diodes.

Parasitic capacitor: parasitic means that the capacitor is not designed in that place, whereas mutual capacitance is always existed between the wiring, the mutual capacitance is like parasitic between the wiring, so these distributed capacitors that distributed among the wires, between the coil and the housing, and between certain components, etc., are called parasitic capacitors. Although the values of these parasitic capacitors are small, they are an important cause of interference.

High-contrast interference: it refers to a phenomenon that an area where the low-brightness image and the high-brightness image are in the same row appears color cast and dark.

At present, the application of LED display screens is becoming more and more extensive, and the circuit structure of LED display screens includes common anode circuits and common cathode circuits. In these two types of driving circuit structures, the parasitic capacitor between the wires will cause strong interference between the display channels. When the high-brightness image and the low-brightness image overlap in one row, the high-brightness image will cause interference to the low-brightness image, and the high-contrast coupling phenomenon will occur.

Among them, the high-contrast interference refers to the superposition of high-brightness images under low-brightness background. At this time, when the LED driving power supply is powered on, the voltage at both ends of the light emitting diode corresponding to high gray will change, while the voltage at both ends of the light emitting diode corresponding to low gray will generally not change.

Exemplarily, as shown in FIG. 1, the default grayscale of LED1 is low gray, and the default grayscale of LED2 is high gray. According to the circuit structure, when powered on, the cathode voltage of LED2 will be pulled down, while at this time, the cathode voltage of LED1 generally will not be pulled down. However, due to the parasitic capacitor between the data lines, the voltage of the high-gray LED2 will be coupled to the low-gray LED1 via the parasitic capacitor in the middle, causing the voltage of LED1 to drop instantly, thereby interfering with the display of LED1. If the default state of LED1 is low-gray lighting, the brightness will be brighter than the default brightness due to the interference of LED2.

Among them, a constant current source in a circuit may provide a stable current output. In the LED drive circuit, a constant current source is widely used in an LED driver. By controlling a current at an LED input end, the brightness of the LED can be controlled.

Figure 2:
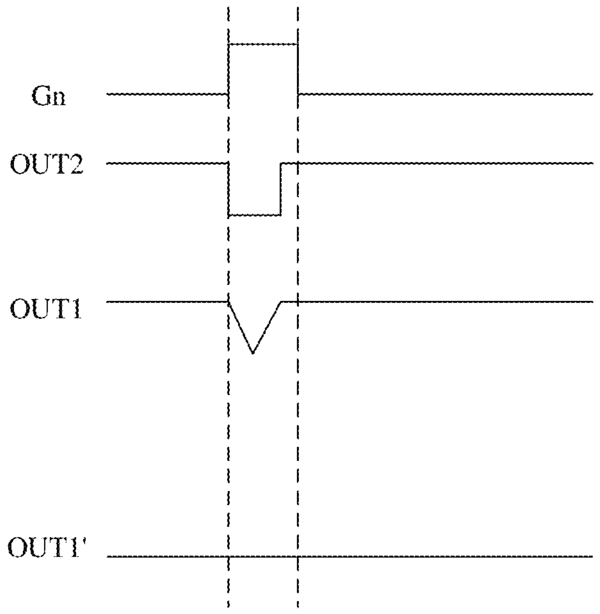
FIG. 2 is a waveform diagram of a voltage at an LED output end in an LED display circuit in the existing technologies.

When powered on, voltage variations at the output ends of LED1 and LED2 are shown in FIG. 2. Based on the characteristics of capacitors, the voltage at both ends of the capacitor cannot change transiently. Thus, theoretically, the voltage at the output end (OUT2) of LED2 changes as much as the voltage at the output end (OUT1) of LED1 changes. In this figure, OUT1' is an ideal waveform of the voltage at the output end of LED1, and Gn represents a row drive signal controlled by a row driver. During a display time of a row where LED1 and LED2 are located, when the voltage OUT2 drops, the voltage OUT1 changes transiently due to the influence of OUT2. As shown in FIG. 2, the voltage OUT1 drops and recovers instantly, which results in the high-contrast interference.

Moreover, the more the ratio of high-brightness to low-brightness or even no brightness in a row of light emitting diodes and the shorter the voltage variation time at one end of the parasitic capacitor and the larger the variation amplitude, the more severe the high-contrast interference phenomenon becomes.

In view of this, an LED array display unit is provided by the embodiments of the present application, in the LED array display unit, a compensation unit connected in parallel between any two adjacent light emitting diodes is arranged, the compensation unit includes an adjustable capacitor and a reverse unit that are connected in series. A capacitance value of the parasitic capacitor between any two adjacent light emitting diodes is a first capacitance value, and the capacitance values of all adjustable capacitors are set to the first capacitance value. The two reverse units between any two adjacent light emitting diodes have opposite conduction directions. By means of the compensation units, the interference between the light emitting diodes in the same row caused by the parasitic capacitor between the wires is eliminated, which thus can improve the high-contrast interference phenomenon of the LED display screen and improve the product quality.

The following introduces an LED array display unit provided by the embodiments of the present application in combination with a specific embodiment.

In an embodiment of the present application, a circuit connection mode may be a common cathode, that is, cathodes of a first LED and a second LED are respectively connected to a row drive unit, and anodes of the first LED and the second LED are respectively connected to a column drive unit. Or alternatively, the circuit connection mode may be a common anode, that is, the anodes of the first LED and the second LED are respectively connected to the row drive unit, and the cathodes of the first LED and the second LED are respectively connected to the column drive unit. The first LED and the second LED are any two adjacent light emitting diodes in an LED array display unit provided in the embodiment of the present application. The following will take the common anode circuit as an example to explain the embodiment of the present application in detail.

Figure 3A:
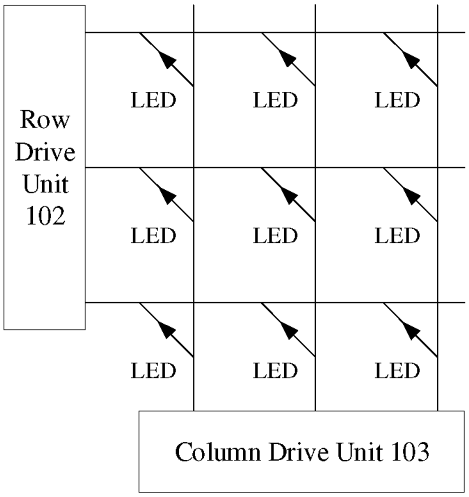
FIG. 3A is a schematic structural diagram of an LED array display unit disclosed in an embodiment of the present application.

FIG. 3A is a structural schematic diagram of an LED array display unit provided in an embodiment of the present application. As shown in FIG. 3A, a circuit structure of the LED array display unit is a common anode circuit, the anode of each LED is connected to the row drive unit, and the cathode of each is connected to the column drive unit.

In each row of the LED array display unit, a first compensation unit 100 and a second compensation unit 200 connected in parallel are provided between any two adjacent light emitting diodes. The first compensation unit 100 includes a first adjustable capacitor and a first reverse unit 1001 connected in series, and the second compensation unit 200 includes a second adjustable capacitor and a second reverse unit 2001 connected in series. The sequential order of the adjustable capacitor and the reverse unit in the compensation unit is not limited. The following is an example in which the adjustable capacitor is on the left and the reverse unit is on the right.

Figure 3B:
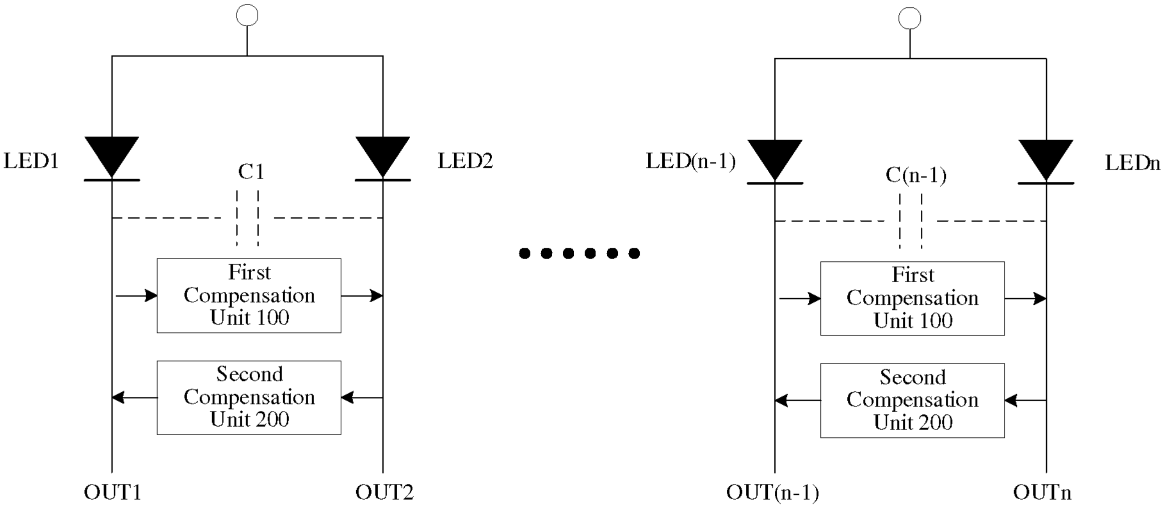
FIG. 3B is a schematic diagram of a circuit structure in an LED array display unit disclosed in an embodiment of the present application.

Exemplarily, as shown in FIG. 3B, LED1 and LED2 are two adjacent light emitting diodes in the same row. The parasitic capacitor between LED1 and LED2 is shown as C1, and a capacitance value of C1 is a first capacitance value. Similarly, C(n−1) denotes a parasitic capacitance between LED (n−1) and LEDn. Since the interference between LED1 and LED2 is due to the parasitic capacitor C1, a capacitance value of the adjustable capacitor should be equal to the capacitance value of the parasitic capacitor C1 to achieve the same function as the parasitic capacitor C1. Further, in FIG. 3B, OUT1, OUT2, OUT((n−1) and OUTn denote output ends corresponding to LED1, LED2, LED(n−1) and LEDn, respectively.

The function of the reverse unit is to reverse the phase of the input signal by 180 degrees. The reverse unit may be a NOT gate or an inverter. The embodiment of the present application is not limited in this regard. The following is an example in which the NOT gate is used as the reverse unit.

Exemplarily, the NOT gate has an input end and an output end. If the voltage at the input end of the NOT gate is at a high level (logic 1), then the voltage at the output end is at a low level (logic 0), and if the voltage at the input end is at a low level, then the voltage at the output end is at a high level. In other words, the level states of the voltages at the input end and the output end are always inverted.

During displaying of LED screen, the corresponding grayscale data is generated according to the displayed image. The brightness of the light emitting diodes is determined by the grayscale data. To control the brightness of the light emitting diodes, the PWM technology is applied to adjust the brightness of the light emitting diodes. In the process of controlling the brightness of the light emitting diodes, a PWM signal is generated by a driver chip and output by the same to the light emitting diodes. When the LED array display unit is powered on, n light emitting diodes display the corresponding brightness of the default grayscale.

Figure 4:
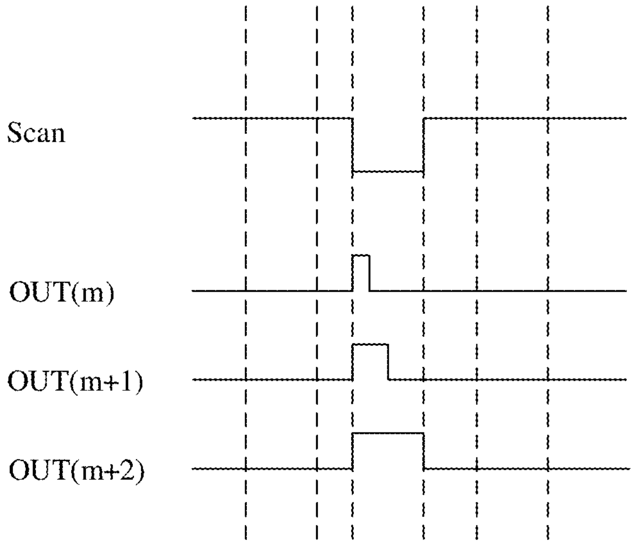
FIG. 4 is a schematic PWM waveform diagram corresponding to an LED output end disclosed in an embodiment of the present application.

Among them, PWM is to change an output effective voltage by changing a duty cycle in a cycle at a suitable signal frequency. The duty cycle is a percentage of time that the pulse is at a higher voltage in an entire pulse cycle. As shown in FIG. 4, Scan is a row drive signal, OUT(m), OUT(m+1) and OUT(m+2) are the PWM waveforms corresponding to the output ends of light emitting diodes LED(m), LED (m+1) and LED(m+2). When the row drive signal in the figure is at a low level, LED(m), LED(m+1) and LED(m+2) are lit up. The ratio of the pulse width time to the total cycle time in the figure is the duty cycle. Different pulse widths correspond to different LED light brightness.

Figure 5A:
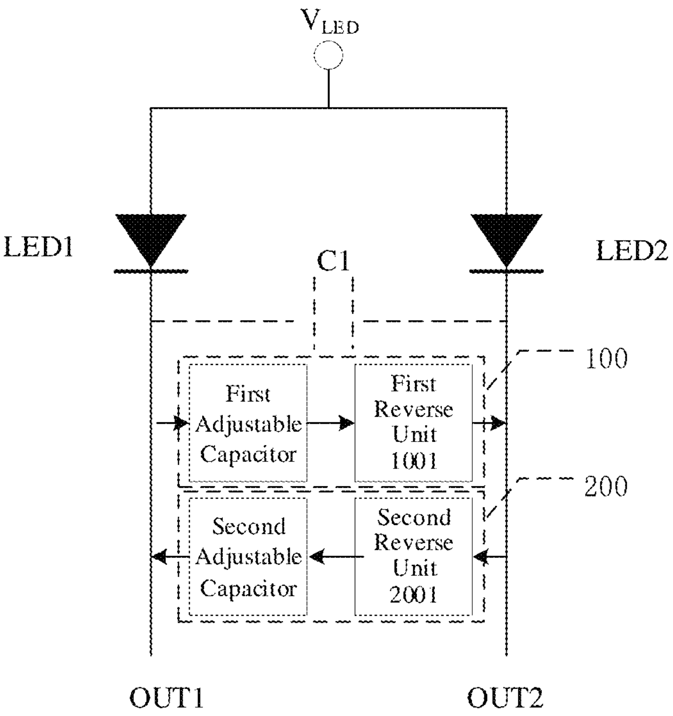
FIG. 5A is a schematic diagram of a circuit structure in an LED array display unit disclosed in an embodiment of the present application.

In an embodiment of the present application, as shown FIG. 5A, the input end of the first reverse unit 1001 is connected to the first LED, and the output end of the first reverse unit 1001 is connected to the second LED, where the first LED and the second LED are two adjacent light emitting diodes in any row of the LED array display unit. When a driving voltage on the first LED increases by a first voltage and the increased voltage is greater than a driving voltage on the second LED, the first LED, the first adjustable capacitor, the first reverse unit 1001 and the second LED constitute a first conductive channel; under the action of the first conductive channel, a first compensation voltage is generated on the second LED, and the first compensation voltage and the first voltage are reversely equal.

Figure 5B:
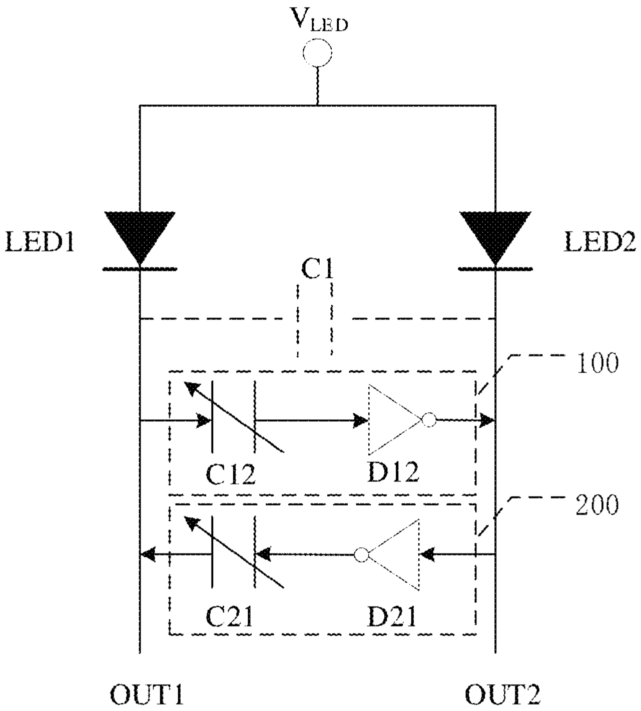
FIG. 5B is a schematic diagram of another circuit structure in the LED array display unit disclosed in an embodiment of the present application.

Exemplarily, as shown in FIG. 5B, the first compensation unit 100 and the second compensation unit 200 connected in parallel are provided between two adjacent channels of LED1 and LED2, and the first compensation unit 100 includes a capacitor C12 and a NOT gate D12. The cathode of LED1 is connected to the capacitor C12, the capacitor C12 is connected to the input end of the NOT gate D12, and the output end of the NOT gate D12 is connected to the cathode of LED2.

Figure 6:
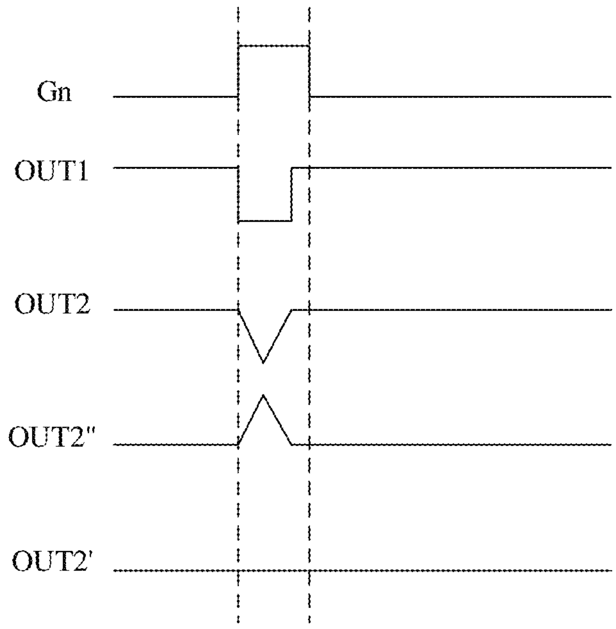
FIG. 6 is a waveform diagram of a voltage on LED2 disclosed in an embodiment of the present application after being affected by the voltage on LED1.

Exemplarily, if the default grayscale of LED1 is high gray, the default grayscale of LED2 is low gray. That is, when the LED driving power supply is powered on, if the driving voltage on the voltage of LED1 increases by the first voltage and the increased voltage is greater than the driving voltage on LED2, then the LED1, the capacitor C12, the NOT gate D12 and the LED2 constitute the first conductive channel. At this time, the voltage on LED1 is coupled to LED2 through the parasitic capacitor C1, as shown in FIG. 6, and the voltage on LED2 is affected by the voltage OUT1 on LED1 and changes transiently, as shown in the waveform OUT2'. Due to the existence of the first conductive channel, the voltage variation on LED1, the first voltage, is filtered by the capacitor C12 to remove the direct current signal and is inverted by the NOT gate D12, to generate a voltage signal that is equal to the reverse voltage of the first voltage, which acts on LED2, and the voltage on LED2 transients reversely, as shown in the waveform OUT2" in FIG. 6. The influence of the voltage at the output end of LED1 on LED2 is compensated, and this compensation behavior is manifested in the output waveform as OUT2" coincides with OUT2', then the actual waveform at the output end of LED2 is shown in OUT2, and LED2 displays the default brightness.

In the embodiment of the present application, returning to FIG. 5A, the input end of the second reverse unit 2001 is connected to the second LED, and the output end of the second reverse unit 2001 is connected to the first LED. When the driving voltage on the second LED increases by a second voltage and the increased voltage is greater than the driving voltage on the first LED, the second LED, the second reverse unit 2001, the second adjustable capacitor and the first LED constitute a second conductive channel; under the action of the second conductive channel, a second compensation voltage is generated on the first LED, and the second compensation voltage and the second voltage are reversely equal.

Exemplarily, returning to FIG. 5B, the second compensation unit 200 includes a capacitor C21 and a NOT gate D21. The cathode of LED1 is connected to the capacitor C21, the capacitor C21 is connected to the output end of the NOT gate D21, and the input end of the NOT gate D12 is connected to the cathode of LED2.

Exemplarily, if the default grayscale of LED1 is low gray, the default grayscale of LED2 is high gray. When the LED driving power supply is powered on, if the driving voltage on the voltage on LED2 increases by a second voltage and the increased voltage is greater than the driving voltage on LED1, then the LED1, the capacitor C21, the NOT gate D21 and the LED2 constitute the second conductive channel. At this time, the voltage on LED2 is coupled to LED1 through the parasitic capacitor C1, and the voltage on LED2 is affected by the voltage on LED1 and changes transiently. Due to the existence of the second conductive channel, the voltage variation on LED2 is filtered by capacitor C21 to remove the direct current signal and is reversed by NOT gate D21 to generate a voltage signal that is equal to the reverse voltage of the second voltage, which acts on LED1, and the voltage on LED1 is reversely transient, thus, the influence of the voltage at the output end of LED2 on LED1 is compensated.

It is mentioned above that the capacitance value of the adjustable capacitor should be equal to the capacitance value of the parasitic capacitor, i.e., the first capacitance value, to achieve the same function as the parasitic capacitor. However, the first capacitance value is unknown, thus, the capacitance value of the first adjustable capacitor is set to the first capacitance value includes that: the capacitance value of the first adjustable capacitor is adjusted when the first LED is lit up and other LED channels in the row where the first LED is located are switched off, and the capacitance value of the first adjustable capacitor is locked when the second LED is in an off state to obtain the first capacitance value.

The two input ends of the LED array display unit are respectively connected to the output end of the row drive unit and the output end of the column drive unit to light up the first LED includes that:

The row where the first LED is located is controlled to display based on a row switch level signal output by the row drive unit. The first LED is driven to light up based on the PWM signal output by the column drive unit.

Among them, the closing of the LED channel may be achieved through a channel control switch.

Figure 7:
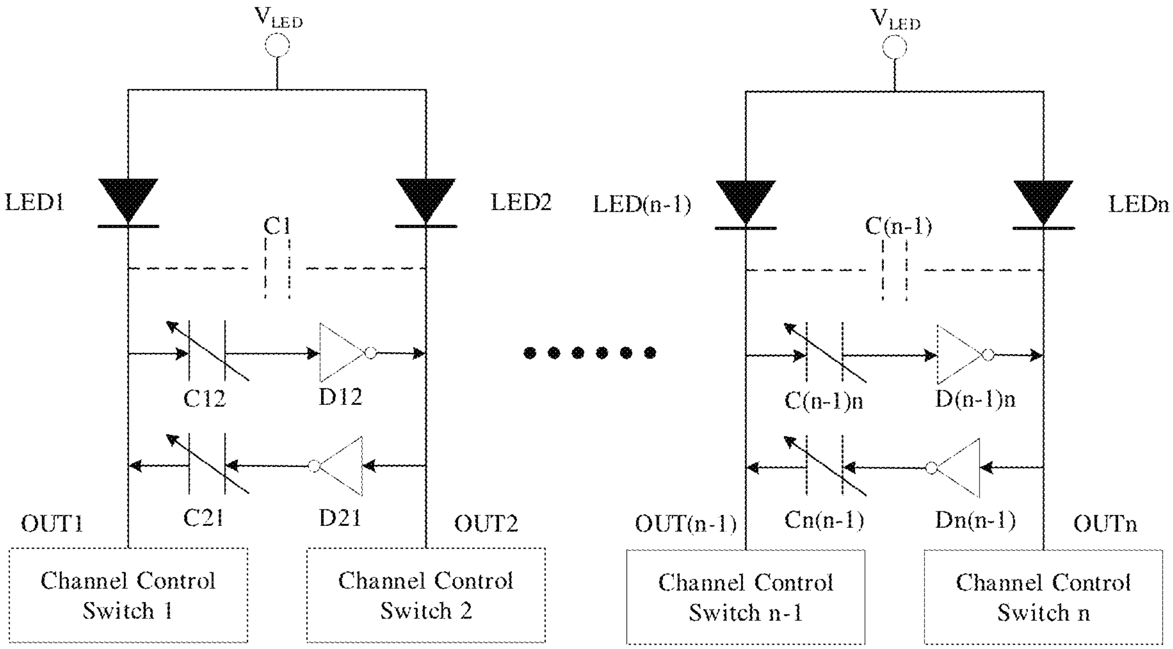
FIG. 7 is a schematic diagram of a circuit structure disclosed in an embodiment of the present application.

Exemplarily, as shown in FIG. 7, the anode of each LED is connected to the LED driving voltage $V_{LED}$, and the cathode of each LED is connected to a channel control switch. For instance, the output end OUT1 of LED1 is connected to channel control switch 1, the output end OUT2 of LED2 is connected to channel control switch 2, the output end OUT(n−1) of LED(n−1) is connected to channel control switch n−1, and the output end OUTn of LEDn is connected to channel control switch n. The channel control switch is configured to control the LED in the corresponding channel to be switched on or off.

The corresponding LED channel is switched on when a valid level is received at the input end of the channel control switch. The corresponding LED channel is switched off when an invalid level is received at the input end of the channel control switch.

In the embodiment of the present application, the adjusting of the capacitance value of the first adjustable capacitor includes operations of: gradually increasing the capacitance value of the first adjustable capacitor from 0, and locking the capacitance value of the first adjustable capacitor when the second LED is switched off. After adjustment, the potential difference across the second LED is 0.

Exemplarily, in the embodiment of the present application, when Cn(n−1) is to be adjusted, only LEDn is switched on, the outputs of all other data lines are switched off, and the state of LED(n−1) is observed. When LED(n−1) is not affected by LEDn, Cn(n−1) is locked, at this time, the capacitance value of Cn(n−1) is equal to the first capacitance value.

Exemplarily, the LED1 is lit up, then all other LED channels are switched off, C12 is debugged, the state of LED2 is observed, and when LED2 is not affected by LED1, that is, when the state of LED2 is in an off state, then C12 is locked. At this time, the capacitance value of C12 is equal to the first capacitance value. At this time, the potential difference across LED2 is 0.

The purpose of this step is to make the capacitance value of the adjustable capacitor being equal to the first capacitance value. Since the capacitance value of the parasitic capacitor is locked unchanged after the screen is produced, the capacitance value of the first adjustable capacitor only needs to be adjusted once to obtain the first capacitance value.

In the embodiment of the present application, since the parasitic capacitor is presented between any two adjacent light emitting diodes, for two non-adjacent light emitting diodes, coupling data may also be iteratively transmitted through multiple parasitic capacitors between the two non-adjacent light emitting diodes. For example, the data of high-gray LED1 may be iteratively transmitted to low-gray LEDn through the parasitic capacitor between each two adjacent light emitting diodes, thereby interfering with a display effect of LEDn.

Similarly, two non-adjacent light emitting diodes may also iteratively transmit anti-interference signals through multiple compensation units between the two non-adjacent light emitting diodes to compensate for the influence of the high-gray LED on the low-gray LED. That is, the interference of high-gray LED1 on low-gray LEDn may also be compensated by multiple compensation units between the two light emitting diodes.

Figure 8:
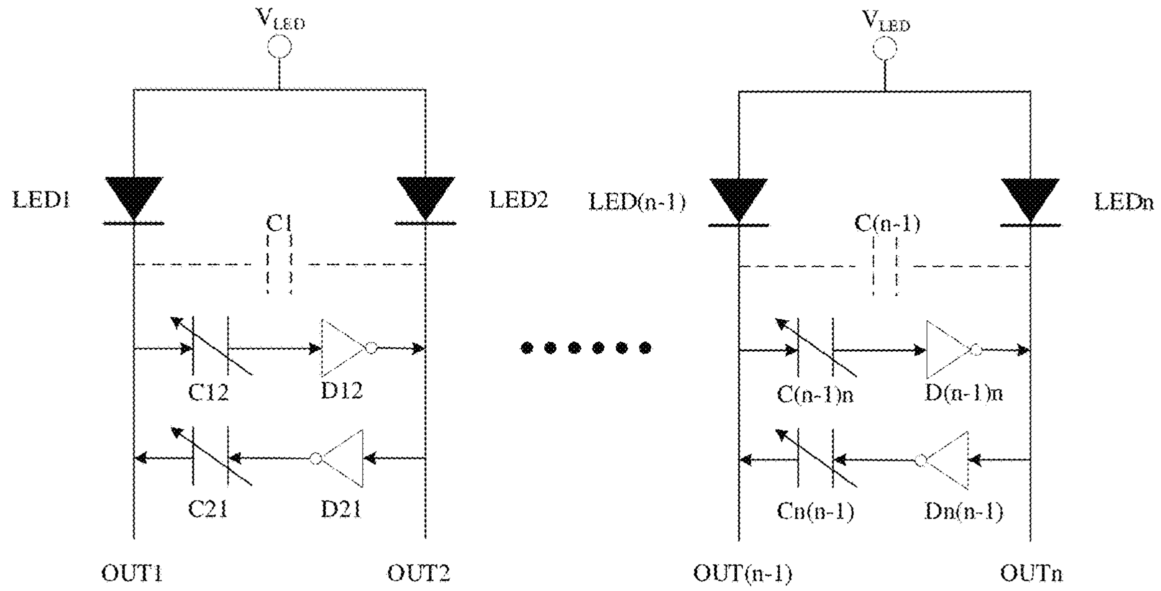
FIG. 8 is a schematic diagram of a circuit structure in an LED array display unit disclosed in an embodiment of the present application.

Exemplarily, as shown in FIG. 8, two compensation units, including a capacitor C12, a NOT gate D12, a capacitor C21 and a NOT gate D21, are provided between LED1 and LED2. Two compensation units, including a capacitor C(n−1)n, a NOT gate D(n−1)n, a capacitor Cn(n−1) and a NOT gate Dn(n−1) are provided between LED(n−1) and LEDn. Because the adjustable capacitors in each compensation unit are connected in series, the influence of LEDn on LED1 through parasitic capacitors C(n−1), . . . , C1 is compensated by (Dn(n−1), Cn(n−1)), . . . , (D21, C21), and the influence caused by high-contrast interference is improved.

In the LED array display unit provided in the embodiment of the present application, two compensation unit connected in parallel are provided between each two adjacent light emitting diodes, the interference between the light emitting diodes in the same row caused by the parasitic capacitors between the wires is eliminated based on a path formed with the compensation units between each two adjacent light emitting diodes, thus the high-contrast interference phenomenon in the LED display screen can be improved, and the product quality can be enhanced.

Figure 9:
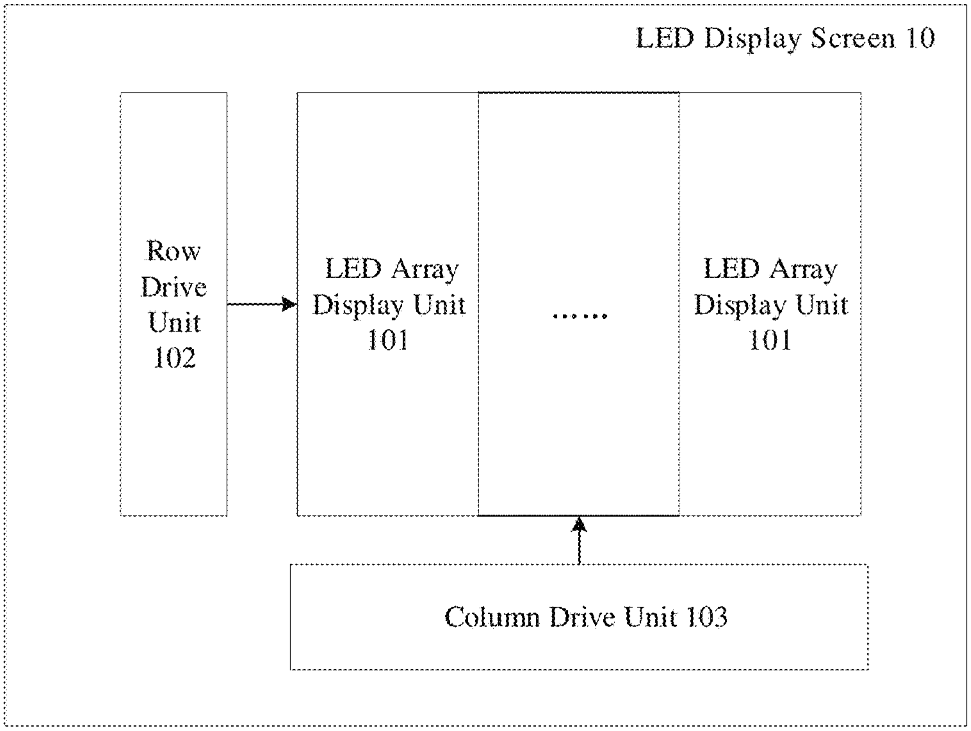
FIG. 9 is a schematic structural diagram of an LED display screen disclosed in an embodiment of the present application.

As shown in FIG. 9, which is a schematic structural diagram of an LED display screen 10 provided in the present application. The LED display screen 10 includes: one or more LED array display units 101, a row drive unit 102 and a column drive unit 103.

Each LED array display unit 101 is the LED array display unit as discussed above, and the LED array display unit includes a plurality of light emitting diodes.

The row drive unit 102 is connected to first input ends of one or more LED array display units 101, and the row drive unit 102 is configured to control the LED array display unit 101 to switch a row based on a row switch level signal.

The column drive unit 103 is connected to second input ends of one or more LED array display units 101, and the column drive unit 103 is configured to generate a PWM signal according to grayscale data, and the PWM signal is configured to control the LED in the LED array display unit 101 to light up and switch off.

When the LED display screen is displaying, the row drive unit 102 is configured to generate the row switch level signal and output the same to the one or more LED array display units 101, to control the LED array display unit 101 to switch a row for displaying. The column drive unit 103 is configured to generate the PWM signal according to the grayscale data and outputs the same to the one or more LED array display units 101, to control the light emitting diodes in the current display row in the LED array display unit 101 to light up.

Figure 10:
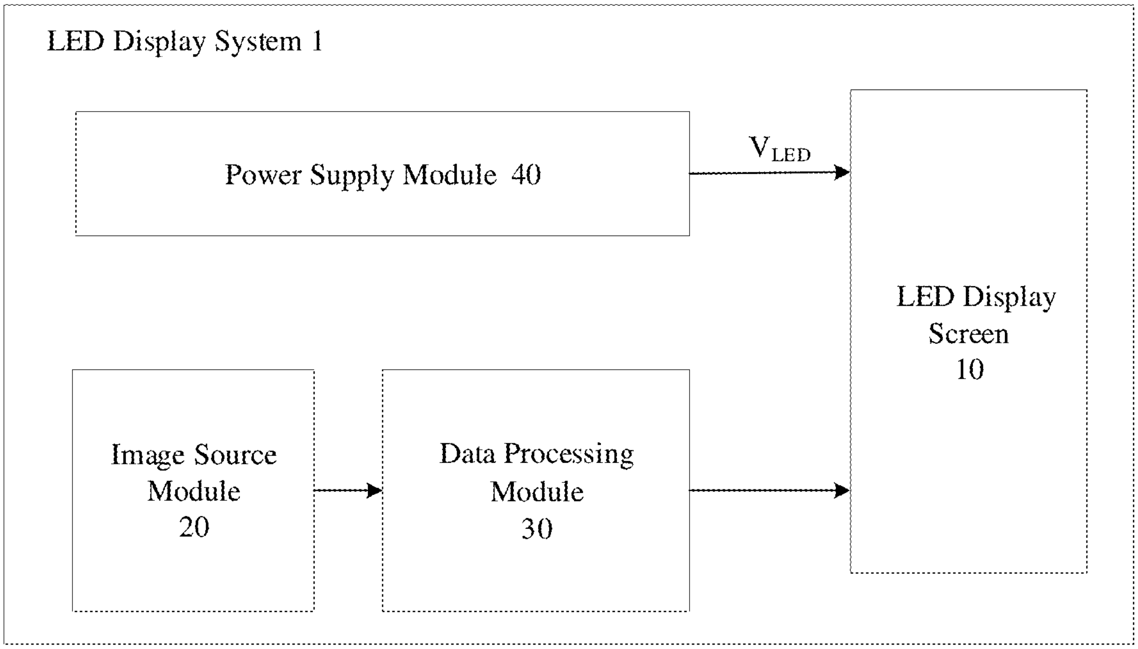
FIG. 10 is a schematic structural diagram of an LED display system disclosed in an embodiment of the present application.

As shown in FIG. 10, which is a structural schematic diagram of an LED display system 1 provided in the present application. The LED display system 1 includes: the LED display screen 10 as discussed above, an image source module 20, a data processing module 30 and a power supply module 40. The image source module 20 is connected to the data processing module 30. The LED display screen 10 is respectively connected to the power supply module 40 and the data processing module 30.

The image source module 20 is configured to send a display image to the data processing module 30.

The data processing module 30 is configured to receive the display image and generate grayscale data according to the display image, and send the grayscale data to the LED display screen 10.

The power supply module 40 is configured to supply power to the LED display screen 10.

The LED display screen 10 is configured to receive the grayscale data and display an image according to the grayscale data.

The beneficial effects of embodiments discussed in conjunction with FIG. 9 and FIG. 10 can be referred to the relevant description in the above other embodiments, and will not be repeated here.

It can be understood that the above embodiments are only exemplary enumerations, which may be determined according to actual use requirements, and the embodiments of the present application are not limited in here.

It should be noted that in the embodiments of the present application, the expression "greater than" may be replaced by "greater than or equal to", and the expression "smaller than or equal to" may be replaced by "smaller than". Or alternatively, the expression "greater than or equal to" may be replaced by "greater than", and the expression "smaller than" may be replaced by "smaller than or equal to".

In the several embodiments provided in the present application, it should be understood that the disclosed display unit and system may be implemented in other ways. For example, the display unit embodiment described above is only schematic, for example, the division of modules or units is only a logical function division, and there may be other division methods in actual implementation, such as multiple units or components may be combined or may be integrated into another device, or some features may be ignored or not executed. Another point is that the mutual coupling or direct coupling or communication connection shown or discussed may be an indirect coupling or communication connection through some interfaces, devices or units, which may be presented in electrical, mechanical or other forms.

The above-mentioned are merely some specific implementations of the present application, and the protection scope of the present application is not limited thereto. Any modifications or replacements made within the technical specifications described in the present application by the technician familiar with the present technology shall all included with the protection scope of the present application.

What is claimed is:

1. A light emitting diode (LED) array display unit, comprising:

a first compensation unit and a second compensation unit connected in parallel and provided between any two adjacent light emitting diodes in each row of the LED array display unit, the first compensation unit comprising a first adjustable capacitor and a first reverse unit that are connected in series, and the second compensation unit comprising a second adjustable capacitor and a second reverse unit that are connected in series;

wherein a capacitance value of a parasitic capacitor between two adjacent light emitting diodes is a first capacitance value, and capacitance values of the first adjustable capacitor and the second adjustable capacitor are set to the first capacitance value; and wherein the first reverse unit and the second reverse unit have opposite conduction directions.

2. The LED array display unit according to claim 1, wherein an input end of the first reverse unit is connected to a first LED, and an output end of the first reverse unit is connected to a second LED; the first LED and the second LED are two adjacent light emitting diodes in any row of the LED array display unit;

the first LED, the first adjustable capacitor, the first reverse unit and the second LED constitute a first conductive channel when a driving voltage on the first LED increases by a first voltage and an increased voltage is greater than a driving voltage on the second LED; and a first compensation voltage is generated on the second LED under an action of the first conductive channel, and the first compensation voltage and the first voltage are reversely equal.

3. The LED array display unit according to claim 2, wherein an input end of the second reverse unit is connected to the second LED, and an output end of the second reverse unit is connected to the first LED;

the second LED, the second reverse unit, the second adjustable capacitor and the first LED constitute a second conductive channel when the driving voltage on the second LED increases by a second voltage and an increased voltage is greater than the driving voltage on the first LED; and a second compensation voltage is generated on the first LED under an action of the second conductive channel, and the second compensation voltage and the second voltage are reversely equal.

4. The LED array display unit according to claim 2, wherein to set the capacitance value of the first adjustable capacitor to be the first capacitance value comprises:

the capacitance value of the first adjustable capacitor is adjusted when the first LED is lit up and other LED channels in a row of the LED array display unit where the first LED is located are switched off, and the capacitance value of the first adjustable capacitor is locked when the second LED is in an off state, to obtain the first capacitance value.

5. The LED array display unit according to claim 2, wherein cathodes of the first LED and the second LED are respectively connected to a row drive unit, and anodes of the first LED and the second LED are respectively connected to a column drive unit; or the anodes of the first LED and the second LED are respectively connected to the row drive unit, and the cathodes of the first LED and the second LED are respectively connected to the column drive unit.

6. The LED array display unit according to claim 1, wherein the first reverse unit is a NOT gate or an inverter; the second reverse unit is a NOT gate or an inverter.

7. The LED array display unit according to claim 4, wherein two input ends of the LED array display unit are respectively connected to an output end of a row drive unit and an output end of a column drive unit; and to light up the first LED comprises:

the row of the LED array display unit where the first LED is located is controlled to display based on a row switch level signal output by the row drive unit; and the first LED is driven to light up based on a pulse-width modulation (PWM) signal output by the column drive unit.

8. The LED array display unit according to claim 4, wherein to adjust the capacitance value of the first adjustable capacitor and lock the capacitance value of the first adjustable capacitor when the second LED is in the off state comprises:

the capacitance value of the first adjustable capacitor is gradually increased from 0, and the capacitance value of the first adjustable capacitor is locked when the second LED after adjustment is in the off state; and a potential difference across the second LED, after adjustment, is 0.

9. The LED array display unit according to claim 3, wherein cathodes of the first LED and the second LED are respectively connected to a row drive unit, and anodes of the first LED and the second LED are respectively connected to a column drive unit; or the anodes of the first LED and the second LED are respectively connected to the row drive unit, and the cathodes of the first LED and the second LED are respectively connected to the column drive unit.

10. A light emitting diode (LED) display screen, comprising:

at least one LED array display unit, and each LED array display unit comprising:

a plurality of light emitting diodes;

a first compensation unit and a second compensation unit connected in parallel and provided between any two adjacent light emitting diodes in each row of the LED array display unit, the first compensation unit comprising a first adjustable capacitor and a first reverse unit that are connected in series, and the second compensation unit comprising a second adjustable capacitor and a second reverse unit that are connected in series;

wherein a capacitance value of a parasitic capacitor between two adjacent light emitting diodes is a first capacitance value, and capacitance values of the first adjustable capacitor and the second adjustable capacitor are set to the first capacitance value; and wherein the first reverse unit and the second reverse unit have opposite conduction directions;

a row drive unit, configured to control the LED array display unit to switch a row based on a row switch level signal; and a column drive unit, configured to generate a pulse width modulation (PWM) signal according to grayscale data, wherein the PWM signal is configured to control the plurality of light emitting diodes in the LED array display unit to light up or switch off.

11. The LED display screen according to claim 10, wherein an input end of the first reverse unit is connected to a first LED, and an output end of the first reverse unit is connected to a second LED; the first LED and the second LED are two adjacent light emitting diodes in any row of the LED array display unit;

the first LED, the first adjustable capacitor, the first reverse unit and the second LED constitute a first conductive channel when a driving voltage on the first LED increases by a first voltage and an increased voltage is greater than a driving voltage on the second LED; and a first compensation voltage is generated on the second LED under an action of the first conductive channel, and the first compensation voltage and the first voltage are reversely equal.

12. The LED display screen according to claim 11, wherein an input end of the second reverse unit is connected to the second LED, and an output end of the second reverse unit is connected to the first LED;

the second LED, the second reverse unit, the second adjustable capacitor and the first LED constitute a second conductive channel when the driving voltage on the second LED increases by a second voltage and an increased voltage is greater than the driving voltage on the first LED; and a second compensation voltage is generated on the first LED under an action of the second conductive channel, and the second compensation voltage and the second voltage are reversely equal.

13. The LED display screen according to claim 11, wherein to set the capacitance value of the first adjustable capacitor to be the first capacitance value comprises:

the capacitance value of the first adjustable capacitor is adjusted when the first LED is lit up and other LED channels in a row of the LED array display unit where the first LED is located are switched off, and the capacitance value of the first adjustable capacitor is locked when the second LED is in an off state, to obtain the first capacitance value.

14. The LED display screen according to claim 11, wherein cathodes of the first LED and the second LED are respectively connected to a row drive unit, and anodes of the first LED and the second LED are respectively connected to a column drive unit; or the anodes of the first LED and the second LED are respectively connected to the row drive unit, and the cathodes of the first LED and the second LED are respectively connected to the column drive unit.

15. The LED display screen according to claim 10, wherein the first reverse unit is a NOT gate or an inverter; the second reverse unit is a NOT gate or an inverter.

16. The LED display screen according to claim 13, wherein two input ends of the LED array display unit are respectively connected to an output end of a row drive unit and an output end of a column drive unit; and to light up the first LED comprises:

the row of the LED array display unit where the first LED is located is controlled to display based on a row switch level signal output by the row drive unit; and the first LED is driven to light up based on the PWM signal output by the column drive unit.

17. The LED display screen according to claim 13, wherein to adjust the capacitance value of the first adjustable capacitor and lock the capacitance value of the first adjustable capacitor when the second LED is in the off state comprises:

the capacitance value of the first adjustable capacitor is gradually increased from 0, and the capacitance value of the first adjustable capacitor is locked when the second LED after adjustment is in the off state; and a potential difference across the second LED, after adjustment, is 0.

18. The LED display screen according to claim 12, wherein cathodes of the first LED and the second LED are respectively connected to a row drive unit, and anodes of the first LED and the second LED are respectively connected to a column drive unit; or the anodes of the first LED and the second LED are respectively connected to the row drive unit, and the cathodes of the first LED and the second LED are respectively connected to the column drive unit.

19. A light emitting diode (LED) display system, comprising:

an LED display screen, comprising:

at least one LED array display unit, and each LED array display unit comprising:

a plurality of light emitting diodes;

a first compensation unit and a second compensation unit connected in parallel and provided between any two adjacent light emitting diodes in each row of the LED array display unit, the first compensation unit comprising a first adjustable capacitor and a first reverse unit that are connected in series, and the second compensation unit comprising a second adjustable capacitor and a second reverse unit that are connected in series;

wherein a capacitance value of a parasitic capacitor between two adjacent light emitting diodes is a first capacitance value, and capacitance values of the first adjustable capacitor and the second adjustable capacitor are set to the first capacitance value; and wherein the first reverse unit and the second reverse unit have opposite conduction directions;

a row drive unit, configured to control the LED array display unit to switch a row based on a row switch level signal; and a column drive unit, configured to generate a pulse width modulation (PWM signal according to grayscale data, wherein the PWM signal is configured to control the plurality of light emitting diodes in the LED array display unit to light up or switch off;

a data processor, connected to the LED display screen;

a power supply module, connected to the LED display screen, and configured to supply power to the LED display screen; and an image source, connected to the data processor, and configured to send a display image to the data processor;

wherein the data processor is configured to receive the display image and generate grayscale data according to the display image, and send the grayscale data to the LED display screen; and the LED display screen is configured to receive the grayscale data and display an image according to the grayscale data.

* * * * *